2 Sheets--Sheet 1.

W. H. MYERS.
Potato-Bug Destroyers.

No. 143,178. Patented September 23, 1873.

Witnesses

Inventor

2 Sheets--Sheet 2.

W. H. MYERS.
Potato-Bug Destroyers.

No. 143,178. Patented September 23, 1873.

Witnesses

Inventor
Wm H Myers

UNITED STATES PATENT OFFICE.

WILLIAM H. MYERS, OF OREGON, ASSIGNOR OF ONE-HALF HIS RIGHT TO BENJAMIN F. PERRY, OF MADISON, WISCONSIN.

IMPROVEMENT IN POTATO-BUG DESTROYERS.

Specification forming part of Letters Patent No. 143,178, dated September 23, 1873; application filed March 1, 1873.

*To all whom it may concern:*

Be it known that I, WILLIAM H. MYERS, of Oregon, in the county of Dane and State of Wisconsin, have invented certain Improvements in Potato-Bug Machines, of which the following is a specification:

The nature of my invention relates to an improved machine for destroying bugs upon potato-vines; and it consists in the arrangement and combination of devices which will be more fully described hereafter.

Figure 1:
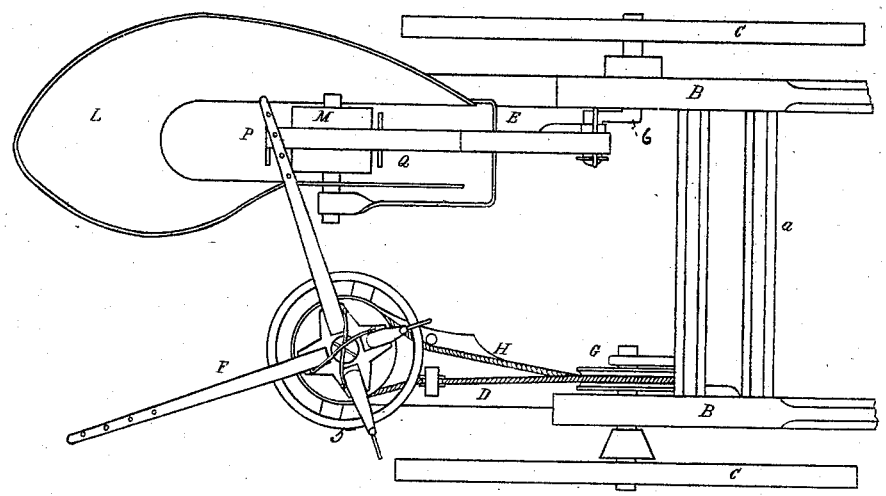
Figure 2:
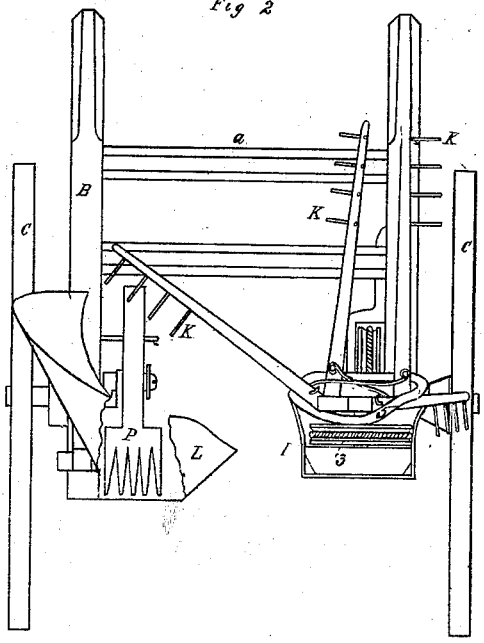
Figure 3:
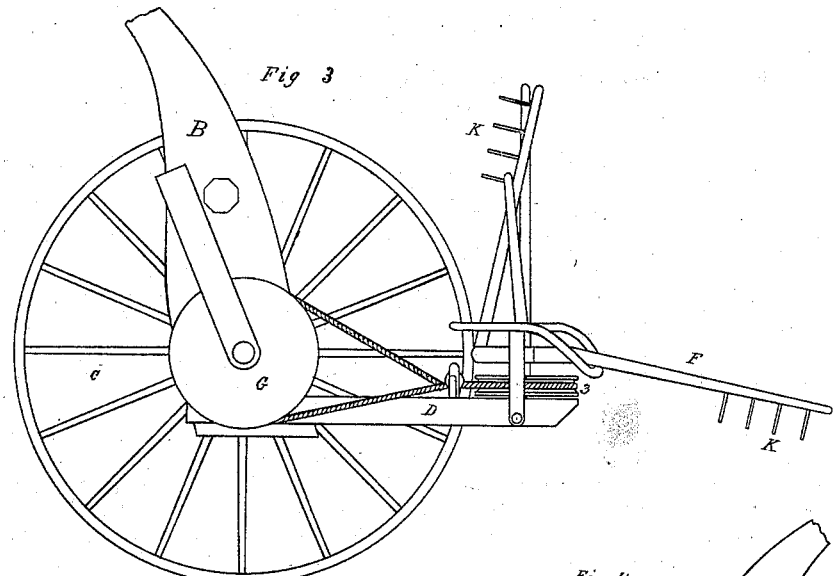
Figure 4:
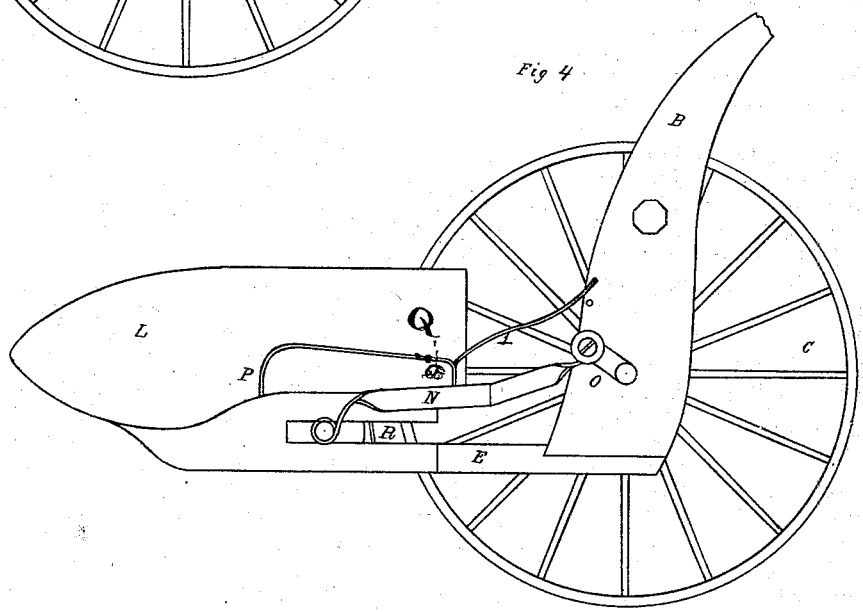

Figure 1 is a plan view of my invention. Fig. 2 is a front elevation of the same. Figs. 3 and 4 are vertical sectional views of the same.

The frame of my machine consists of the two handles B, united together by the cross-pieces $a$; is mounted upon the two driving-wheels $c$, which are placed far enough apart to straddle over any desired number of rows. The axle 6 of one of the wheels is cranked upon its inner end, and has attached to it a pitman, N, for operating back and forth the roller M for crushing the bugs, and the rake P, for drawing the bugs from the front part of the scoop L back under the roller. To the rear end of the rake is attached an arm, 1, which catches under a projection on the side of the handle, so that, as the rake moves forward, it will be raised upward, so as to pass over the bugs which have been swept into the scoop, but falls as soon as it has completed its stroke, so as to bring the bugs backward with it on its return stroke. The scoop is made of any desired shape or size, supported upon the top of the beam E, and has a slot, R, formed in its side, near its rear end, through which the journals of the roller project. Upon the axle of the other wheel is placed a pulley, G, over which a driving cord or chain, H, passes, and which communicates motion to a second pulley, 3, supported upon the bar D, and to which are secured the hinged rakes F, provided with elastic teeth K.

As the machine moves forward these rakes are set in motion, revolving round and round, so as to sweep the bugs from the vines into the scoop, each one being regulated and controlled in its movement by the inclined ring or guide 5, so that, in passing in front of the driving-wheel after having swept the vines, each one will be alternately raised into a vertical position, as shown in Figs. 2 and 3.

The teeth are made elastic, so as not to tear the vines or become clogged.

Having thus described my invention, what I claim as new, and desire to secure by Letters Patent, is—

1. A machine for destroying bugs provided with revolving rakes F, scoop L to receive the bugs, roller M, and rake P for destroying the bugs, substantially as shown and described.

2. The cranked axle 6, pitman N, and rake P, in combination with the scoop having roller M, all arranged so as to keep the bugs drawn beneath the roller, substantially as shown and described.

3. The roller M, operated by the cranked axle, pitman, and roller, in combination with the scoop, all arranged so as to destroy the aforesaid bugs, substantially as shown and described.

WILLIAM H. MYERS.

In presence of—
   J. H. CARPENTER,
   CHARLES TABOR.